United States Patent [19]

Pitchford, Jr.

[11] Patent Number: 4,665,862
[45] Date of Patent: May 19, 1987

[54] TIMED AUTOMATIC PET FEED AND WATER DISPENSER

[76] Inventor: Robert L. Pitchford, Jr., 1418 W. 134th St., Compton, Calif. 90222

[21] Appl. No.: 813,913

[22] Filed: Dec. 27, 1985

[51] Int. Cl.4 .................................................. A01K 5/02
[52] U.S. Cl. .................................................. 119/51.11
[58] Field of Search ............... 119/51.11, 51 R, 56 R; 62/236

[56] References Cited

U.S. PATENT DOCUMENTS

| | | | |
|---|---|---|---|
| 3,376,856 | 4/1968 | Crippen | 119/51.11 X |
| 3,526,210 | 9/1970 | Burton | 119/51 R |
| 3,636,312 | 1/1972 | Drener et al. | 119/73 X |
| 3,678,902 | 7/1972 | Ruth | 119/51.11 |
| 3,962,997 | 6/1976 | Ruth | 119/51.11 |
| 3,974,660 | 8/1976 | Farr | 62/236 |
| 4,051,812 | 10/1977 | DeLoach et al. | 119/51.11 |
| 4,079,699 | 3/1978 | Longmore et al. | 119/51.11 |
| 4,279,221 | 7/1981 | Arvizu | 119/51.11 |
| 4,284,035 | 8/1981 | White | 119/51.11 |
| 4,363,291 | 12/1982 | Harmser | 119/51 R |
| 4,491,086 | 1/1985 | Croteau | 119/51.11 |

Primary Examiner—Hugh R. Chamblee
Attorney, Agent, or Firm—Paul H. Ware

[57] ABSTRACT

A timed, automatic pet food and water dispenser (10) which incorporates a leveraged loading storage bin (28,12) for receiving a supply of particulate pet feed and having means for mixing water with said particulate feed (62,20,70) therewith to produce a gravy and a softening of said particulate feed. A feed dispensing auger (60) measures a predetermined amount of said particulate feed and furnishes said feed to a feed dish (22) at predetermined time intervals controlled by a timer system (74). A water container (24) comprising level control means (26) provides water for drinking purposes independently of said timer system.

2 Claims, 6 Drawing Figures

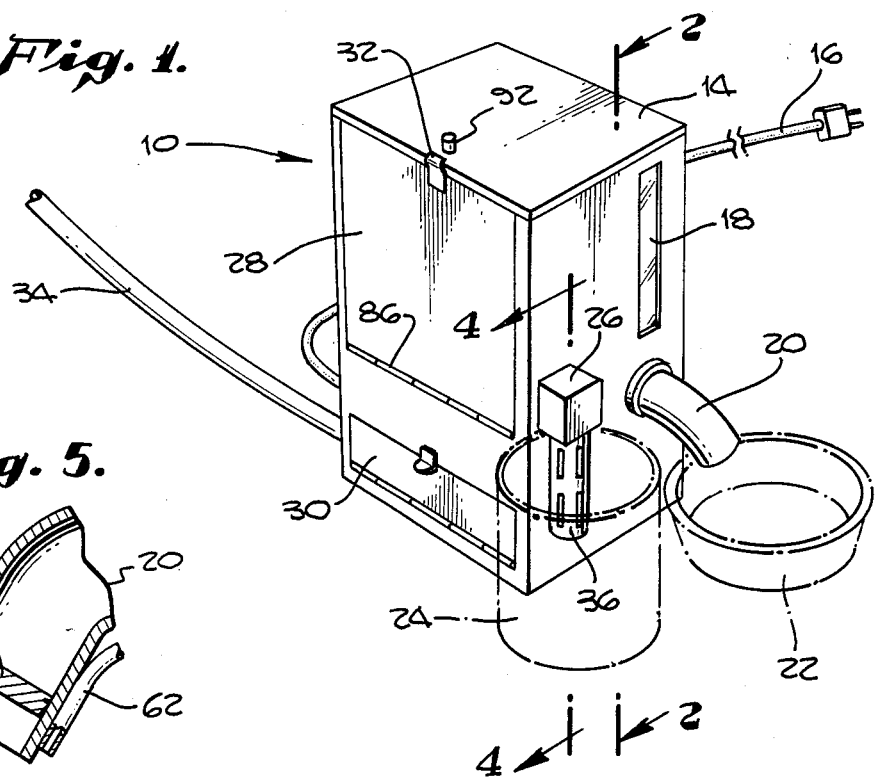
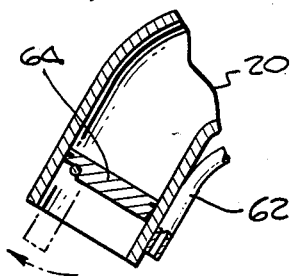
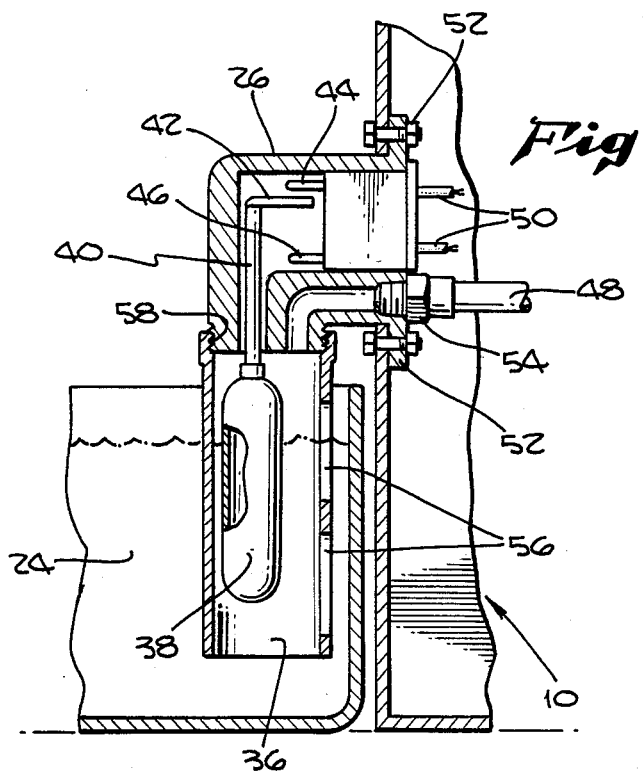

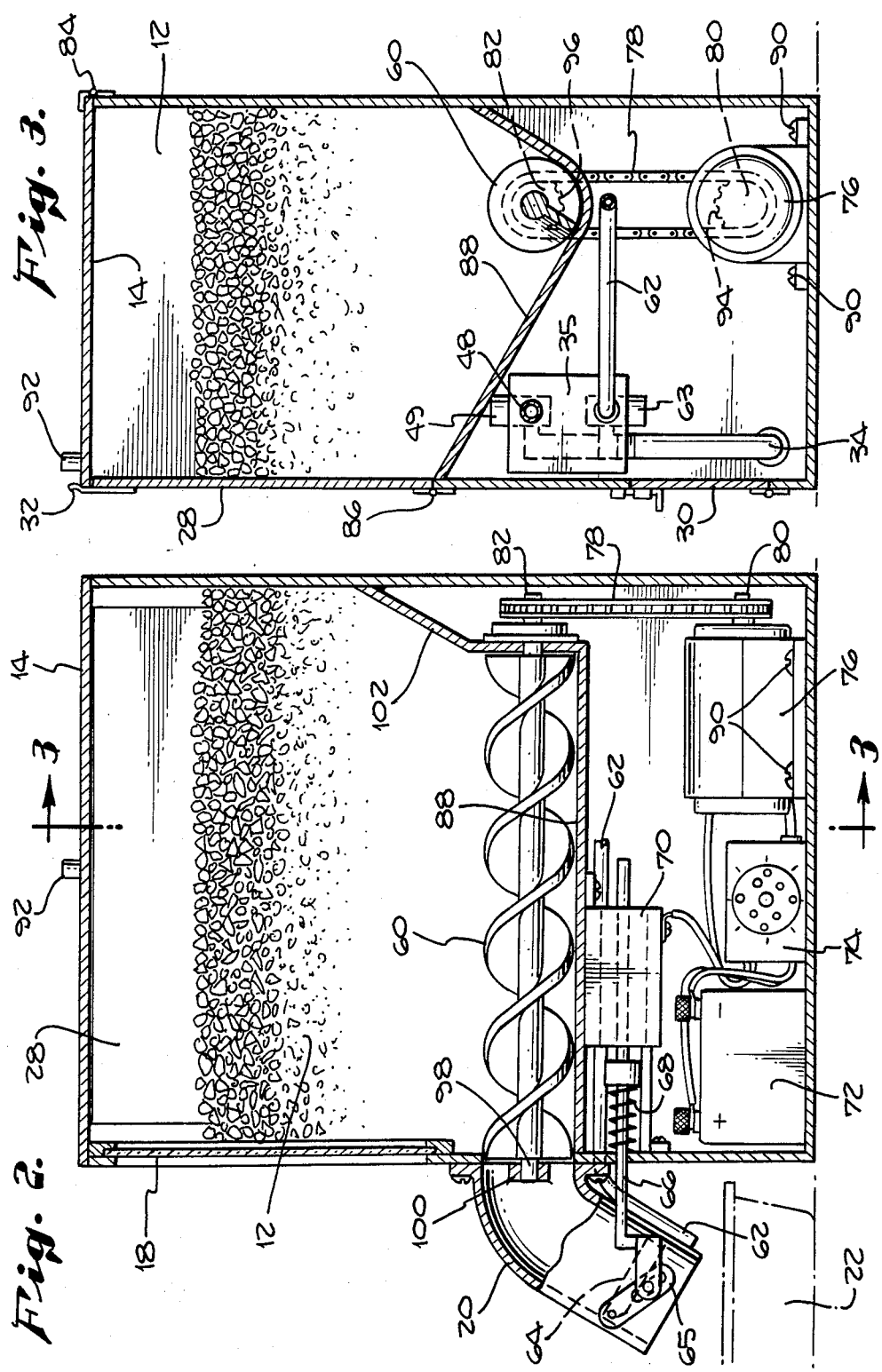

TIMED AUTOMATIC PET FEED AND WATER DISPENSER

BACKGROUND OF THE INVENTION

1. Field of the Invention

This invention relates generally to the automatic provision of food and water to animals upon preselected, timed intervals.

2. Description of the Prior Art

Timed pet and animal feeders are known in which measured amounts of pet or animal feed are dispensed at preselected intervals. However, some of these prior art devices have not provided for water to be mixed with a granular or particulate feed nor has any provision been made for drinking water to be furnished to the animal. At least one prior art device has furnished feed to the animal upon the animal's demand thus allowing it to gorge itself continuously. Thus many of the prior art animal feeders have only partially solved the problems presented, presented new problems or both. Most have thus met special needs as presented by specific problems and have therefore, served narrow purposes. Some have been unreliable and unpredictable in operation under continued use and have been expensive and complicated to manufacture. Some of these prior art devices have been described in the following patents that were brought to the attention of the applicant through a novelty search conducted in the U.S. Patent and Trademark Office.

U.S. Pat. No. 3,678,902 to Ruth for TIMED ANIMAL FEEDER is not interval timed, rather, the feed dispenser is triggered by sunrise and sunset. Actually, as the inventor points out, "The level detector is preferably responsive to changes in light level from darkness to daylight... The value should be set sufficiently high to prevent triggering on the darkness caused by a thunderstorm or heavy cloud cover. This would allow the dispensing of too much food during a 24 hour period." Thus a problem is pointed out but not solved. Additionally, there does not appear to be a continuous water supply, only a holding tank that must be refilled by a human attendant. Further, the feed must be lifted to the top of the bin for loading, that is, no leveraged loading is provided. Still further, it is not immediately apparent just how the flow of particulate feed is stopped. If the granularity is fine enough, all the feed in the bin could run out of the trough, that is, until all the feed in the bin is exhausted to the outside. As stated in the patent, "... the volume of the pyramid being determined by the granular nature of the feed, spacing of the opening 18 and the diameter of the opening." Thus, a delicate balance may be required because after a dumping of feed, there will be remaining feed in the trough so that the flow just might continue until all the feed in the bin becomes exhausted to the outside and the animals could gorge themselves to sickness.

U.S. Pat. No. 3,962,997, also to Ruth for ANIMAL FEEDER involves no timing at all. Additionally, there is no provision for the dispensation of water, either to be mixed with dry feed or for purposes of drinking. A first embodiment provides a dribble of feed for as long as the agitating auger runs. It is interesting to note that the purpose served by the auger in this device is the agitation of the feed rather than the controlled measurement of the animal feed dispensed. A second embodiment dumps a quantum of feed by means of the container 74. No provision for leveraged loading into the storage bin of the device has been implemented for the convenience of the user.

U.S. Pat. No. 4,051,812 to DeLoach et al for AUTOMATIC ANIMAL FEEDING APPARATUS presents another device in which the auger does not convey a measured amount of feed to the feeding receptacle, but merely agitates the feed so that the feed will fall through holes into the feeding receptacle. It is also to be noted that the device has not been designed for pet feeding, rather the feeding of animals to be fattened such as hogs is contemplated. It would be possible for the animal to eat itself to death just by keeping on eating so as to empty the receptacle, at which point, more feed will be dispensed.

U.S. Pat. No. 4,284,035 to White for AUTOMATIC LIVESTOCK FEEDER while providing a timed dispensation of feed of a measured amount, does not provide for water either to be mixed with the feed or to be drunk by the animal. The amount of feed dispensed cannot be changed except by changing the feed dispenser E, thus the amount of feed dispensed, though predetermined, is not adjustable. Additionally, there is no provision for the dispensation of water to the animal either for mixing with the feed or for drinking purposes.

It would thus be a great advantage to the art to provide an automatic pet feed and water dispenser capable of varying the amount of feed dispensed.

Another significant advantage would be found in the provision of an automatic power backup system whereby the apparatus will operate and the animal will be fed and watered regardless of an interruption in the domestic power supply.

It would be a further significant advantage to provide a device capable of furnishing water for the animal to drink in addition to water to be mixed with dry feed to make a gravy for the animal's greater enjoyment of its food.

Another principal advantage would be the provision of means of easy loading of feed into the storage bin so that a small non-muscular person might load a large quantity of feed into the bin without undue discomfort and strain.

Another important advantage would be realized if a feed level indicator incorporated into the device provided some measurement of the amount of feed remaining in the storage bin.

An important advantage would be the facility for replenishment of the water supply dependent on the level of water remaining in a receptacle from which the animal may drink.

Provision of an adjustable, interval-timed food supply that provides precise volume measurement of dispensed food at controlled and adjustable intervals of time represents an additional leading advantage sought by the invention.

SUMMARY OF THE INVENTION

It is the purpose of the present invention to provide for the above-stated desired advantages, thus a paramount object of the present invention is to provide a timed automatic pet food and water dispenser.

It is a further specific object of the present invention to provide a means of mixing water with dry pet feed so as to make a gravy and thus enhance the pet's enjoyment of its food.

An additional notable object of this invention is to provide easy loading of pet feed into the storage bin of the device.

Another substantial object of the present invention is to provide precise volume measurement of dispensed food at selectable timed intervals.

In the accomplishment of these and other objects a Timed Automatic Pet Food and Water Dispenser is provided in which food may be dispensed to the pet at selected time intervals. It is a feature of the inventive device that water is always available for the pet to drink, being replenished when the level reaches a low point and being stabilized at a high level point. Means to mix water with dry pet food to make a gravy is also a main feature of the inventive device.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is a perspective view of the Timed Automatic Pet Food and Water Dispenser wherein the water container and the feed dish have been shown in phantom.

FIG. 2 is an enlarged cross sectional view taken along the sight lines 2—2 of FIG. 1.

FIG. 3 is a cross sectional view taken along the sight lines 3—3 of FIG. 2.

FIG. 4 is an enlarged detail drawing of the water dispensing apparatus taken along the sight lines 4—4 of FIG. 1.

FIG. 5 is an enlarged detail drawing of the feed chute showing the opening and closing mechanism.

FIG. 6 is a line schematic drawing helpful in understanding the overall operation of the invention.

DETAILED DESCRIPTION

Although a specific embodiment of the invention will now be described with reference to the drawings, it should be understood that such embodiments are by way of example only and merely illustrative of but a small number of the many possible specific embodiments which can represent applications of the principles of the invention. Various changes and modifications, apparent to one skilled in the art to which the invention pertains, are deemed to be within the spirit, scope and contemplation of the invention as further defined in the appended claims.

Referring to FIG. 1 with greater particularity, the Timed Automatic Pet Food and Water Dispenser is denoted generally by the numeral 10. The top of the feed storage bin (FIG. 2), is identified by the numeral 14. Electric power for timing and operating the device is supplied by means of electric supply cable 16. Top or lid 14 has a lift handle knob 92 that works in cooperation with a latch mechanism 32 attached to feed loading door 28. Feed loading door 28 is connected to feed storage bin 12 by means of front hinge 86. It is one of the convenience features of the invention that a large bag of dry pet feed may be leveraged into the storage bin 12 by first releasing latch mechanism 32 then opening the top 14 of the feed storage bin and then lowering the feed loading door 28 by means of hinge 86. The large bag of dry pet feed may then be opened and placed on the feed loading door 28 with the open end toward and into the storage bin. Lifting the loading door thus provides a mechanical advantage through the lever action of the hinge 86 until the door is in the vertical position at which time the bag may be emptied and removed after which the top 14 may be closed and latched by means of latch mechanism 32. A feed level indicator 18 may be merely a glass insert through which a visual indication of the amount of feed left in the bin may be determined. A control mechanism access door 30 permits access to the timing and controlling mechanisms to be discussed infra. A feed chute 20 is provided to dispense feed into feed dish 22 shown in phantom. The water level control 26, to be explained later, is shown in place above float chamber 36 situated so as to control the water level of water supplied by main water supply 34 into water container 24.

Referring now to FIG. 2, a view provided by the sight lines 2—2 of FIG. 1 may be examined. As noted the feed storage bin is denoted by the numeral 12, the top or lid of the storage bin is identified by the numeral 14, while the feed loading door is denoted by the numeral 28. The lift handle knob for lid 14 is identified by the numeral 92 while the feed level indicator is called-out by numeral 18.

A feed auger 60 having multiple flights, is shown situated near the contoured bottom 88 of bin 12. Feed auger 60 has a forward auger reduced shaft 98 by means of which it is supported at one end by front bearing support 100. Feed auger 60 is supported at its other end by included wall and auger support member 102. Dry feed from storage bin 12 will be supplied to feed chute 20 in a volume amount determined by the number of rotations permitted to auger 60 by means of the controlling mechanism to be explained in greater detail subsequently. Feed chute 20 incorporates a chute open-and-close butterfly valve 64 having a pivoting extension arm activator 65 itself activated by control member 66. Control member 66 is operated under the influences of solenoid activating means 70 and resilient member 68 shown in the figure as a spring situated about the shaft of control member 66.

An electric motor drive 76, secured by motor bolts, 90 drives auger 60 through the cooperation of a chain drive or the like 78 driven by means of drive sprocket 80 attached to the shaft of electric motor 76 whereby auger sprocket 82 is also driven by drive 76. The numeral 74 denotes a timer, battery charger and AC to DC converter, operated in well known and conventional manner to power and time the operation of the pet feeding device. Numeral 72 denotes a backup power pack to be brought on line whenever a domestic power failure occurs so that power cannot be supplied to the unit by means of electric supply cable 16 (FIG. 1). A food-mixing water supply 62 furnishes water to be mixed with the dry feed in the bin 12 so as to make gravy for the pets greater enjoyment of its food. Water is furnished for this purpose under the action of another solenoid valve 63 (FIG. 6).

FIG. 3 affords an end view defined by the sight lines 3—3 of FIG. 2. Numeral 84 shows a rear hinge which constrains and operates the top or lid 14. The water diverting manifold 35 comprises water supply pipe 48, water supply pipe solenoid valve 49, food mixing water supply pipe 62, food mixing water supply solenoid valve 63 and input provision for receiving water from main water supply means 34. The numerals 94 and 96 denote sprocket teeth on drive sprocket 80 and auger sprocket 82 respectively.

Referring now to FIG. 4, means to supply and control drinking water for the pet may be examined. Within the water container 24 there is situated a float chamber 36 having an interior float 38. Float chamber 36 is connected to water level control mechanism 26 by means of threaded float chamber connection means 58. Water level control mechanism 26 is secured to the wall of the storage bin by means of securing bolts 52. Water is brought into float chamber 36 by means of water supply pipe 48 and connected thereto by water pipe connector 54. The water thus brought in is dispensed to water container 24 through slots 56 in the float chamber and the open bottom of the float chamber. The switching mechanism, powered by means of electric cables 50, is operated off by cut off switch actuator 44. When float 38 is driven upward by a rising water level in water container 24 and thus also in float chamber 36, horizontal float stem member 42 on vertical float stem 40 will press upward against cut off switch actuator 44 thus acting to cut off the flow of water into water container 24. Conversely when float 38 is allowed to travel downward under the action of gravity and a lowering water level, horizontal float stem member 42 will press downward against cut on switch actuator 46 which is connected so as to permit the flow of water into water container 24. Thus the water level in water container 24 will be maintained within limits specified by limit switches 44 and 46, said limits comprising an upper water level limit and a lower water level limit.

FIG. 5 shows the chute open and close means 64 in its activated position in phantom along with the food mixing water supply 62.

The line schematic drawing of FIG. 6 shows the main water supply means 34 being supplied into the water diverting manifold 35 wherein it is split into two supply legs. One leg, controlled by the food mixing water supply solenoid valve 63, furnishes water along the feed chute 20 by means of food mixing water supply 62. The other leg, controlled by water supply pipe solenoid valve 49, furnishes water to water level control mechanism 26 by means of water supply pipe 48.

Thus there has been described a Timed Automatic Pet Food and Water Dispener that will allow the controlled feeding of pets without the owner's being in personal attendance. Great improvements in flexibility, personal freedom, ease of operation, reliability and economy have been provided through the novel advantages of the invention.

It is pointed out that although the present invention has been shown and described with reference to a particular embodiment, nevertheless various changes and modifications, apparent to one skilled in the art to which the invention pertains, are deemed to lie within the purview of the invention.

What is claimed and desired to be secured by Letters Patent of the United States is:

1. In combination, a timed automatic pet food and water dispenser comprising:
   means to store a quantity of dry, particulate animal feed wherein said means to store itself comprises;
   a feed storage bin;
   a top of said feed storage bin attached thereto by a rear hinge;
   a feed loading door forming a side of said feed storage bin;
   a front hinge attaching said feed loading door to said feed storage bin;
   a lift handle knob on said top of said feed storage bin for opening and closing said feed storage bin at its top;
   a latch mechanism for securing said top of said feed storage bin to said feed loading door;
   a contoured member forming the bottom of said bin;
   a transparent insert in a side of said storage bin whereby the level of dry, particulate feed may be directly viewed by an observer;
   means to dispense measured quantities of said dry, particulate animal feed, said means to dispense itself comprising:
   a feed auger situated in said contoured bottom;
   means to drive said auger through a predetermined number of revolutions including electric power supply, an electric motor, an electric motor drive sprocket attached to a shaft of said electric motor, an auger sprocket attached to a shaft of said auger at one end, means connecting said drive sprocket to said auger sprocket whereby said auger sprocket will be driven in response to rotation of said drive sprocket, a bearing support to constrain said auger at its other end, a timer for determining intervals of time at which said electric motor will be excited and for determining the duration of said excitation of each such timed interval, a feed chute situated at one end of said auger and secured in said storage bin, whereby said auger will be rotated for a predetermined length or time at each timed interval thus dispensing a measured amount of feed to said feed chute determined by the rate of rotation of said auger and the duration of said rotation;
   main water supply means to furnish drinking water for an animal;
   means connected to said main water supply to mix water with said dry, particulate animal feed so as to form a gravy;
   means to open and close said feed chute, said means itself comprising:
   solenoid activating means;
   a control member shaft situated in said solenoid activating means so as to be controlled thereby;
   a chute open-and-close butterfly valve pivotally connected to said shaft; and
   a resilient member located about said shaft and constraining said shaft in such manner as to hold said butterfly valve in a closed position;
   whereby said butterfly valve remains closed by the action of said resilient member until said solenoid member, upon being excited, forces said shaft into such motion as to open said valve.

2. The timed automatic pet food and water dispenser of claim 1 including the further limitations of:
   means to leverage-load quantities of dry, particulate feed into said bin including a substantially horizontal position of said feed loading door, whereby a packaged quantity of dry feed may be opened at one end and placed upon said door with its open end toward the interior of said bin and whereby said feed may be leverage-loaded into said bin by raising said door such that said front hinge acts as a fulcrum;
   and wherein said main water supply means includes:
   a main water supply pipe;
   a main water supply solenoid valve for controlling said main water supply;

a water container;

a water level control mechanism comprising;

a float chamber located in said water container and having an open bottom and slotted sides and secured to said water level control mechanism which is in turn secured to said storage bin;

a float situated in said float chamber having a vertical float stem with a horizontal float stem member at one end thereof;

a cut-on switch actuator and a cut-off switch actuator situated in said water level control mechanism such that said cut-on switch actuator is contacted by said horizontal float stem member whenever water in said water container reaches a low level and said cut-off switch actuator is contacted by said horizontal float stem member whenever water in said water container reaches a high level;

whereby as an animal drinks water thus lowering the water level in said container, said water level control mechanism replenishes said water so as to maintain a level of water between preset limits so that drinking water may be always available to the animal;

and wherein said means to mix water with said animal feed includes:

a feed dish;

a water diverting manifold connected to said main water supply;

a food mixing water supply solenoid valve located in said water diverting manifold and controlling a part of the water flow therefrom;

a food mixing water supply pipe adjacent said feed chute and controlled by said food mixing water supply solenoid valve so as to supply water into said dish along with said dry, particulate animal feed and to make a gravy therein;

and wherein said electric power supply includes an electric supply cable suitably connected to a source of domestic electric power;

a distribution circuit connected so as to supply electric power to each electric element of said dispenser;

an electric storage battery;

a battery charger for charging said storage battery; and an alternating current to direct current converter for charging said battery from said domestic electric power.

* * * * *